Oct. 11, 1960
A. L. HUBBARD
2,955,881
COTTON PICKER
Filed May 20, 1959
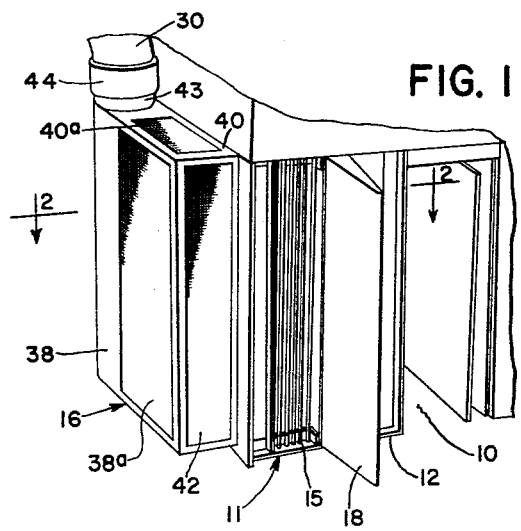
FIG. 1
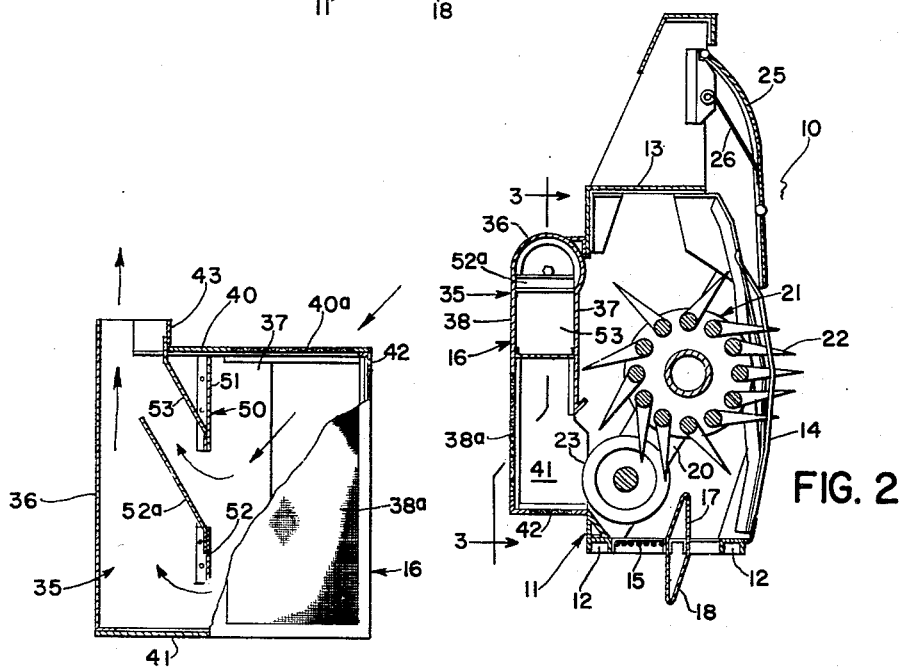
FIG. 2
FIG. 3
INVENTOR.
A.L. HUBBARD
ATTORNEYS

United States Patent Office 2,955,881
Patented Oct. 11, 1960

2,955,881
COTTON PICKER

Arthur L. Hubbard, Des Moines, Iowa, assignor to Deere & Company, Moline, Ill., a corporation of Delaware Filed May 20, 1959, Ser. No. 814,444

8 Claims. (Cl. 302—58)

This invention relates to a cotton harvester of the type having harvesting mechanism and a suction type conveying system which moves the harvested cotton to a receptacle. More particularly this invention relates to an improved door or casing structure positioned outwardly of the harvesting mechanism with an enlarged upright opening adjacent to the harvesting mechanism for receiving bolls therefrom and an outlet opening into the suction duct means thereby serving as a means of transferring the cotton from the harvesting mechanism to the suction duct.

A representative cotton picker of the general class referred to is disclosed in U.S. Patent issued to Arthur L. Hubbard September 22, 1959, wherein it will be seen that the picking machine operates over a field in which the cotton is planted in rows. Each picking unit includes picking spindles that are barbed and rotate to pull the cotton from the ripened bolls as the machine advances, the spindles being arranged in a drum which rotates at a relatively high rate of speed to carry the spindles in an obit, part of which is through the plants and through a doffing mechanism which removes the cotton from the spindles. The cotton is transferred from the doffing mechanism into a door structure which ultimately transfers the picked cotton to a basket or receptacle by pneumatic conveying means. The opening into the door is conventionally the same height as the harvesting mechanism. The normal construction of the door consists of a series of panels which cause the door structure to be formed into front and rear compartments, the rear compartment having the opening for receiving cotton and the front compartment having the outlet at its forward upper end which feeds into the suction duct. The two compartments are divided by an upright panel which is spaced from the floor of the door structure so that the cotton passing through the opening will normally be directed downwardly to pass into the front compartment through the space between the lower edge of the panel and the floor of the door structure. A door of this nature was shown and described in U.S. Patent 2,729,513, issued to H. N. Swim, Jr., January 3, 1956.

In U.S. Patent 2,912,285, which issued to Arthur L. Hubbard November 10, 1959, there is therein disclosed an improvement of the door structure shown in the Swim patent. Among other improvements there is the feature of providing open or perforated grille panels in the rear compartment which permits air from outside of the harvester to be fed into the suction duct means. The results of this improvement is that most of the trash and foreign matter brought into the harvester by the spindles is not sucked into the pneumatic conveyor since the air required for the conveying means is brought directly from the outside.

However, even with the improved door shown in the aforementioned Hubbard application, there nevertheless is some trash thrown into the door structure by the harvesting mechanism. Due to gravity, and also due to the inherent characteristics of the cotton plant, the trash will normally be accumulated fairly low in the harvesting mechanism and will tend to enter the suction door at a relatively low elevation. Consequently, the cotton passing into the door structure will normally be cleaner in the upper portions of the door than in the lower portions. In the door structures prior to the present invention, all the cotton would accumulate on the floor of the door structure and would tend to sweep trash and other foreign matter into the suction duct means. Also, there will be the normal amount of dust generated from the harvester moving over the field which will tend to be drawn into the door structure generally from the lower perforated portions of the door structure.

It is the main purpose of the present invention to provide a further improvement in the door structure for a cotton harvester which features providing panel structure between the front and rear compartments of the door structure which has a plurality or at least two vertically spaced openings affording communication between the front and rear compartment. The lower opening will normally comprise the area between the lower edge of the panel means and the upper surface of the floor of the door structure. The upper opening will be at a higher elevation and will tend to permit passage of cotton from the upper elevations of the rear compartment through the upper opening and into the front compartment. As a result, the clean cotton will be drawn into the suction duct means before it has the opportunity of descending into the lower portion of the door structure where it would tend to pick up the particles of trash and move them into the suction duct means.

It is a further object of the present invention to provide with the aforesaid panel structures an upwardly and forwardly extending baffle which has its upper edge disposed adjacent the outlet and which will tend to divert the stream of air required to accommodate the suction created by the pneumatic conveying means so that part of the stream will pass through the upper openings of the panel structure. A part of the air will, of course, be permitted to pass through the lower opening, but the stream of air will be of less intensity and consequently there will be sufficient draft to pick up the cotton but will not be sufficient to pick up the heavier articles of trash. Also, the draft of air through the perforated panels of the rear compartment will tend to be relatively low in intensity at the lower portion of the door and there will be less tendency to sweep in the dust laden air close to the ground level.

As a result of the baffle and the vertically spaced openings, more efficient use of the suction fan or blower may be had since most of the cotton passing into the door is not permitted to gravitate thereby not requiring the power to raise it the height of the door.

Other objects and advantages of the present invention will become apparent to those skilled in the art as the nature of the invention is better understood from the following description and as shown in the accompanying drawings.

Fig. 1 is a rear and side perspective view of a portion of the cotton harvester.

Fig. 2 is a sectional plan view of a harvesting unit of the type shown in Fig. 1 and taken substantially along the line 2—2 of Fig. 1.

Fig. 3 is a partial sectional view taken substantially along the line 3—3 of Fig. 2.

The harvesting machine chosen for purposes of illustration is of the type shown and described in the aforementioned Hubbard applications. The harvester may be of the one-row or two-row type, and in either case the harvester is constructed to provide a plant passage, indicated by the reference numeral 10, with a picking unit being disposed on opposite sides of the passage. Since the picking units are generally of the same construction only that shown on the outer or left side of the plant passage and here indicated in its entirety by the reference numeral 11, will be described. The picking or harvesting unit is composed generally of framework, such as at 12, which is supported from a main frame, not shown carried by a tractor or other type of mobile power source. Also serving as part of the supporting structure is an upright housing composed of a front wall 13, inner wall structure in the form of a series of vertically spaced apart grid bars 14 adjacent the passage 10, and rear wall structure in the form of transversely spaced apart vertical bars 15. The housing structure is generally open to its outer side with the opening being closed by a door structure indicated in its entirety by the reference numeral 16. Extending inwardly from the rear wall structure is a baffle 17. Also projecting rearwardly from the rear wall structure is a second or outer baffle 18. The housing is generally opened from the bottom with the exception of a diagonal plate 20 which supports from underneath a vertical picking drum 21 composed of a series of parallel and horizontal rows of picking spindles 22 which are spaced apart vertically. Adjacent to and rearwardly of the drum 21 is a doffing mechanism, indicated in its entirety by the reference numeral 23, composed of a series of vertically spaced doffing plates spaced on the order of the spacing of the spindles which operate to doff the cotton from the spindles and to dispatch it outwardly through the outer open side of the housing.

The cotton harvester operates in the following manner. As the harvester is moved forwardly over the field, the grid bars 14 will pass adjacent to the row of plants as the plants pass through the stalk passage 10. The spindles 22 will extend through the grid bars and will contact the ripe bolls on the cotton plants, and will snag the cotton fibers. The ripe cotton will then be drawn into the housing. The baffle member 17 will tend to peel off trash and other foreign matter which becomes attached to the cotton and will drive it outwardly to the rear of the cotton harvester. The outer baffle 18 will prevent the trash from reentering into the harvesting mechanism and will generally discharge the trash a considerable distance from the harvester. The spindles will then pass adjacent the doffing mechanism 23 which will operate to doff the cotton from the spindles and dispatch it through the outer open side of the housing and into the door structure 16.

Other mechanism on the harvesting unit includes a forwardly positioned presser plate 25 which is spring-biased at 26 to gently but effectively compress the cotton plants and to guide them into the stalk passage 10. Conventional in cotton harvesters is a form of cotton conveyor which includes a relatively large blower or fan, not shown, mounted adjacent the receptacle, also not shown, which is part of a suction conveying system terminating in the suction duct 30 adjacent the forward end of the door structure 16. As is obvious, the suction duct 30 opens into the door structure 16 and draws the ripe cotton into the duct 30 where it is dispatched or conveyed into the awaiting receptacle.

The door structure 16 is composed of a series of rigidly connected panels including a forward upright sheet 35 having the shape of a U with a bight or front upright panel portion 36 and inner and outer upright panel portions 37, 38 respectively extending rearwardly from opposite ends of the front portion or panel 36. Disregarding for the moment that the rear portion 38a of the outer panel 38 is perforated, the rear terminal edge of the outer panel 38 extends rearwardly a substantial distance from the rear terminal edge of the inner upright panel 37. The panels 37, 38 are substantially parallel and spaced apart transversely and have horizontally coplanar top edges and horizontally coplanar bottom edges. The upper edges of the inner and outer panels 37, 38 are interconnected by a top panel 40 and the lower edges of the inner and outer panels 37, 38 are interconnected by a bottom or lower panel 41. Extending inwardly from the rear edge of the panel 38 is a transverse rear panel 42 which closes the rear end of the door structure. The rear edge of the inner panel 37 forms with the inner face of the rear panel 42 a material opening which faces inwardly toward the cotton harvesting mechanism and receives cotton therefrom. The forward portion of the upper panel 40 has rigidly affixed thereto a semi-circular and upwardly projecting lip or collar 43. The front panel portion 36 extends upwardly and forms a complementary part to the portion 43 whereby both the upper portion of the panel 36 and the portion 43 form an annular collar which receives a coupling member 44 at the lower end of the suction duct 30.

It becomes obvious from viewing the figures in the drawings that the panels 35, 40, 41 and 42 form a casing closing the outer side of the picker housing with an upright opening facing inwardly to receive the cotton bolls from the harvesting mechanism and with a material outlet at its forward and upper end for discharging the cotton bolls into the suction duct 30.

Intermediate the discharge outlet and the intake opening of the door structure or casing is a transverse panel means 50 fixed to and disposed within the casing to effect division of the casing into front and rear compartments. The transverse panel means or structure 50 includes an upright transverse panel 51 which depends from the upper panel 40 and terminates substantially one-third of the height of the door structure. A second panel 52 is provided in spaced relation beneath the lower edge of the panel 51 and forms with the panel 51 an upper passage effecting communication between the front and rear compartments of the casing or door structure. The lower panel 52 terminates in spaced relation to the lower panel 41 and to provide a lower material passage between the front and rear compartments. The panel 52 has an upwardly and forwardly extending portion 52 or panel section 52a which has an upper edge terminating adjacent to and beneath the suction duct 30. The upper panel portion 52a operates as a baffle and effects movement of air and cotton into the suction duct 30 from the rear compartment via the upper of the two passageways. Spaced above and substantially parallel to the portion 52a is a third transverse panel 53 which forms with the portion 52a and the side walls or panels 37, 38, a funnel leading from the rear compartment to the upper forward portion of the front compartment. The upper and lower panels 51, 52 extend transversely across the opening in the casing and are flanged on opposite edges and are fixed to the panels 37, 38 by rivets or any other suitable means. The upper panel 53 is fixed to the panel 51 by means of welding.

Referring to the door structure as a whole, the rear portion 38a of the outer side panel 38 is perforated or otherwise grilled to permit passage of air from outside of the harvester into the suction duct 30. Similarly, a rear portion 40a of the upper panel 40 is also perforated to permit air to pass. The rear panel 42 is entirely perforated and consequently the panel portions 40a, 38a, and 42 which form the rear compartment of the casing or door structure are generally open to permit passage of air while restricting passage of cotton or other material. The panel structure forming the forward compartment is obviously imperforate.

The door or casing structure will operate in conjunction with the harvesting mechanism in a preferred manner. Since the harvesting mechanism including the picking drum 21 and doffing mechanism 23 are substantially the height of the door structure 16, and since the main or largest producing portion of the plant is generally in its upper portion, the greater amount of cotton will be dispatched from the harvesting mechanism substantially at the height of the opening between the upper panel 51 and the lower panel 52. Generally, the lower portion of the cotton plants is not as heavily laden with cotton bolls and consequently a relatively small amount of cotton will be dispatched in the door structure or casing 16 adjacent the lower panel 41. With the panel portion 52a extending beneath the suction duct 30, a portion of the draft created by the suction within the duct 30 will be directed to pass through the upper opening formed by the transverse panel structure 50. The direction of flow of air is indicated by arrows in Figs. 1 and 3. As a result, the cotton passing into the door structure 16 at the relatively high elevation will pass immediately into the suction duct 30 and then to receptacle. There will, however, remain a considerable draft through the passage or opening between the lower panel member 52 and the lower or floor panel 41 to pick up or sweep the material passing into the casing at a lower elevation.

While only one form of the invention has been shown, it should be understood that other forms and variations will occur to those skilled in the art. Therefore, while the present disclosure was set forth in detail for purposes of illustrating the principles of the invention, it is not the desire to so limit or narrow the invention beyond the broad general concepts set forth in the appended claims.

What is claimed is:

1. A panel structure for a cotton harvester having harvesting mechanism and cotton conveying means including a suction duct, said panel structure comprising: an inner upright panel adjacent the harvesting mechanism and an outer upright panel spaced outwardly from the inner panel; upper and lower laterally disposed panels rigid with the inner and outer panels; transverse panel means extending across the space between the inner and outer upright panels, said transverse panel means being rigid with the inner, outer, upper and lower panels and forming therewith an upright casing adjacent to the harvesting mechanism, said casing having a vertically extending opening in its inner panel through which cotton may be received into the casing, said casing having an outlet opening upwardly and into the suction duct whereby the suction from within said suction duct will create an upwardly moving draft of air in said casing, said outlet being spaced forwardly of said opening; transverse and upright panel structure fixed to and disposed within the casing between the outlet and opening and effecting division of said casing into front and rear compartments, said transverse panel structure having a plurality of vertically spaced apart openings to afford communication between the front and rear compartments, a baffle fixed to the casing and extending upwardly and forwardly from the transverse panel structure from beneath an upper opening of said vertically spaced openings, said baffle having an upper terminal edge adjacent the outlet and effecting movement of air and cotton into the suction duct from the rear compartment via said upper opening.

2. A panel structure for a cotton harvester having harvesting mechanism and cotton conveying means including a suction duct, said panel structure comprising: an inner upright panel adjacent the harvesting mechanism and an outer upright panel spaced outwardly from the inner panel; upper and lower laterally disposed panels rigid with the inner and outer panels; transverse panel means extending across the space between the inner and outer upright panels, said transverse panel means being rigid with the inner, outer, upper and lower panels and forming therewith an upright casing adjacent to the harvesting mechanism, said casing having a vertically extending opening in its inner panel through which cotton may be received into the casing, said casing having an outlet opening upwardly and into the suction duct whereby the suction from within said suction duct will create an upwardly moving draft of air in said casing, said outlet being spaced forwardly of said opening; transverse and upright panel structure fixed to and disposed within the casing between the outlet and opening and effecting division of said casing into front and rear compartments, said transverse panel structure having a pair of vertically spaced apart openings to afford communication between the front and rear compartments from an upper and lower elevation, a baffle fixed to the casing and extending upwardly and forwardly from the transverse panel structure from beneath the upper opening of said vertically spaced openings, said baffle having an upper terminal edge adjacent the outlet and effecting movement of air and cotton into the suction duct from the rear compartment via said upper opening.

3. A panel structure for a cotton harvester having harvesting mechanism and cotton conveying means including a suction duct, said panel structure comprising: an inner upright panel adjacent the harvesting mechanism and an outer upright panel spaced outwardly from the inner panel; upper and lower laterally disposed panels rigid with the inner and outer panels; transverse panel means extending across the space between the inner and outer upright panels, said transverse panel means being rigid with the inner, outer, upper and lower panels and forming therewith an upright casing adjacent to the harvesting mechanism, said casing having a vertically extending opening in its inner panel through which cotton may be received into the casing, said casing having an outlet opening upwardly and into the suction duct whereby the suction from within said suction duct will create an upwardly moving draft of air in said casing, said outlet being spaced forwardly of said opening; transverse panel structure fixed to and disposed within the casing including a laterally disposed baffle between and spaced from said upper and lower panels, said baffle having a forward terminal edge adjacent the outlet and in said draft of air and a rear terminal edge adjacent the vertically extending opening and for guiding air and cotton into the suction duct from the area above the baffle and from the area below the baffle.

4. For use with a cotton harvester having harvesting mechanism and cotton conveying means including a suction duct, panel means on said harvester defining an upright casing closed at its upper and lower ends adjacent to the harvesting mechanism, said casing having a vertically extending opening in an upright side panel through which cotton may be received into the casing from the harvesting mechanism, said casing having an outlet opening into the suction duct whereby the suction from within said suction duct will create a draft of air within said casing, said outlet being spaced from said opening; panel structure fixed to and disposed within the casing including a laterally disposed baffle between and spaced from said upper and lower ends of the casing, said baffle having a terminal edge adjacent the outlet and in the aforesaid draft of air and a terminal edge adjacent the opening and for guiding the air and cotton into the suction duct from the area above the baffle and from the area below the baffle.

5. The invention defined in claim 4 in which the opening receiving the cotton is substantially the height of the casing, the outlet is relatively small, and the baffle is inclined between its terminal edges with the terminal edge adjacent the opening being disposed relative to the vertically extending opening whereby cotton passing through the upper portion of the opening will move to said outlet above the baffle.

6. The invention defined in claim 4 further characterized by panel means depending from the lower face of the baffle with a lower edge spaced from the lower end of the casing to effect division of the casing into compartments one of which includes the portion of the casing having the outlet, and the other including the portion of the casing having the vertically extending opening, said depending panel means and said baffle providing upper and lower openings affording communication between the compartments.

7. The invention defined in claim 6 in which a portion of the casing defining the rear compartment is composed of grillework.

8. For use with a cotton harvester having harvesting mechanism and cotton conveying means including a suction duct, panel means on the harvester defining an upright casing adjacent to the harvesting mechanism, said casing having a vertically extending opening in an upright side panel through which cotton may be received into the casing from the harvesting mechanism, said casing having an outlet opening into the suction duct whereby the suction from within the duct will create a draft of air within the casing, said outlet being spaced from the opening; upright panel structure fixed to and disposed within the casing between the outlet and the opening and effecting division of said casing into adjacent upright compartments, said panel structure defining a plurality of vertically spaced apart openings to afford communication between the compartments and to permit flow of cotton from one compartment into the other in vertically spaced apart paths of movement.

References Cited in the file of this patent

UNITED STATES PATENTS 2,729,513    Swim                   Jan. 3, 1956